United States Patent
Ng

(10) Patent No.: US 9,512,877 B2
(45) Date of Patent: Dec. 6, 2016

(54) LINEAR MOTION BEARING WITH IMPROVED OUTER HOUSING SLEEVE

(71) Applicant: Thomson Industries, Inc, Amherst, NY (US)

(72) Inventor: Alison Ng, New York, NY (US)

(73) Assignee: Thomson Industries, Inc., Amherst, NY (US)

( * ) Notice: Subject to any disclaimer, the term of this patent is extended or adjusted under 35 U.S.C. 154(b) by 0 days.

(21) Appl. No.: 14/750,263

(22) Filed: Jun. 25, 2015

(65) Prior Publication Data

US 2015/0369281 A1  Dec. 24, 2015

Related U.S. Application Data

(63) Continuation of application No. 13/810,262, filed as application No. PCT/US2011/044161 on Jul. 15, 2011, now abandoned.

(60) Provisional application No. 61/364,532, filed on Jul. 15, 2010.

(51) Int. Cl.
*F16C 29/06* (2006.01)

(52) U.S. Cl.
CPC .......... *F16C 29/0607* (2013.01); *F16C 29/069* (2013.01)

(58) Field of Classification Search
CPC ... F16C 17/022; F16C 29/067; F16C 29/0611; F16C 29/0688; F16C 29/0679; F16C 29/0685; F16C 29/069; F16C 29/0676
USPC ............................ 384/43–46, 49–50, 52, 57
See application file for complete search history.

(56) References Cited

U.S. PATENT DOCUMENTS

| | | | |
|---|---|---|---|
| 2,628,135 A | 2/1953 | Magee | |
| 3,545,826 A | 12/1970 | Magee et al. | |
| 3,767,276 A | 10/1973 | Henn | |
| 3,900,233 A * | 8/1975 | Thomson | B21H 7/187 384/43 |
| 4,138,167 A * | 2/1979 | Ernst | F16C 29/069 384/43 |
| 4,469,380 A | 9/1984 | Cowles, Sr. | |
| 4,480,879 A * | 11/1984 | Reith | F16C 29/0688 384/43 |
| 5,046,862 A | 9/1991 | Ng | |
| 5,346,313 A | 9/1994 | Ng | |
| 5,558,442 A | 9/1996 | Ng | |
| 5,613,780 A | 3/1997 | Ng | |

(Continued)

FOREIGN PATENT DOCUMENTS

| | | |
|---|---|---|
| DE | 2922625 A1 | 12/1980 |
| WO | 9925983 A1 | 5/1999 |
| WO | 00/25034 A1 | 5/2000 |

*Primary Examiner* — Marcus Charles
(74) *Attorney, Agent, or Firm* — Dilworth & Barrese, LLP

(57) ABSTRACT

A linear motion bearing assembly comprising a ball retainer structure having at least a portion of a plurality of open axial ball tracks formed therein. The ball tracks including an open load-bearing portion, an open return portion and turnarounds interconnecting the load bearing and return portions. A plurality of bearing balls are disposed in the ball tracks. At least one load bearing plate is axially positioned adjacent the ball retainer structure for receiving load from the balls disposed in the load-bearing portion of the ball tracks. Various outer housing sleeves are disclosed including a structure split axially and a monolithic structure.

8 Claims, 6 Drawing Sheets

(56) References Cited

U.S. PATENT DOCUMENTS

| | | | |
|---|---|---|---|
| 5,921,682 A * | 7/1999 | Kitade | ............... F16C 29/0602 |
| | | | 348/478 |
| 6,637,941 B2 * | 10/2003 | Greiner | .............. F16C 29/0695 |
| | | | 384/43 |
| 6,805,637 B2 | 10/2004 | Daenzer et al. | |
| 8,317,397 B2 | 11/2012 | Klein | |
| 2002/0067868 A1 * | 6/2002 | Lyon | ....................... F16C 13/04 |
| | | | 384/43 |
| 2008/0107365 A1 | 5/2008 | Mueller | |

* cited by examiner

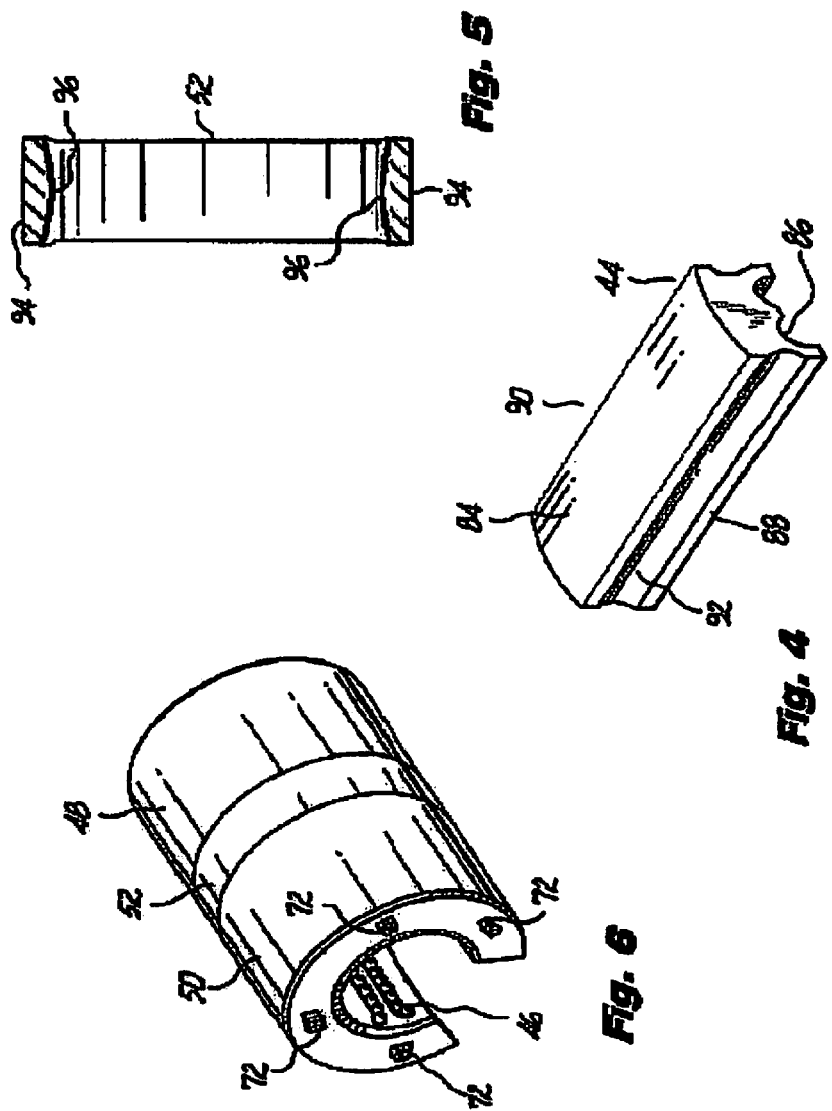

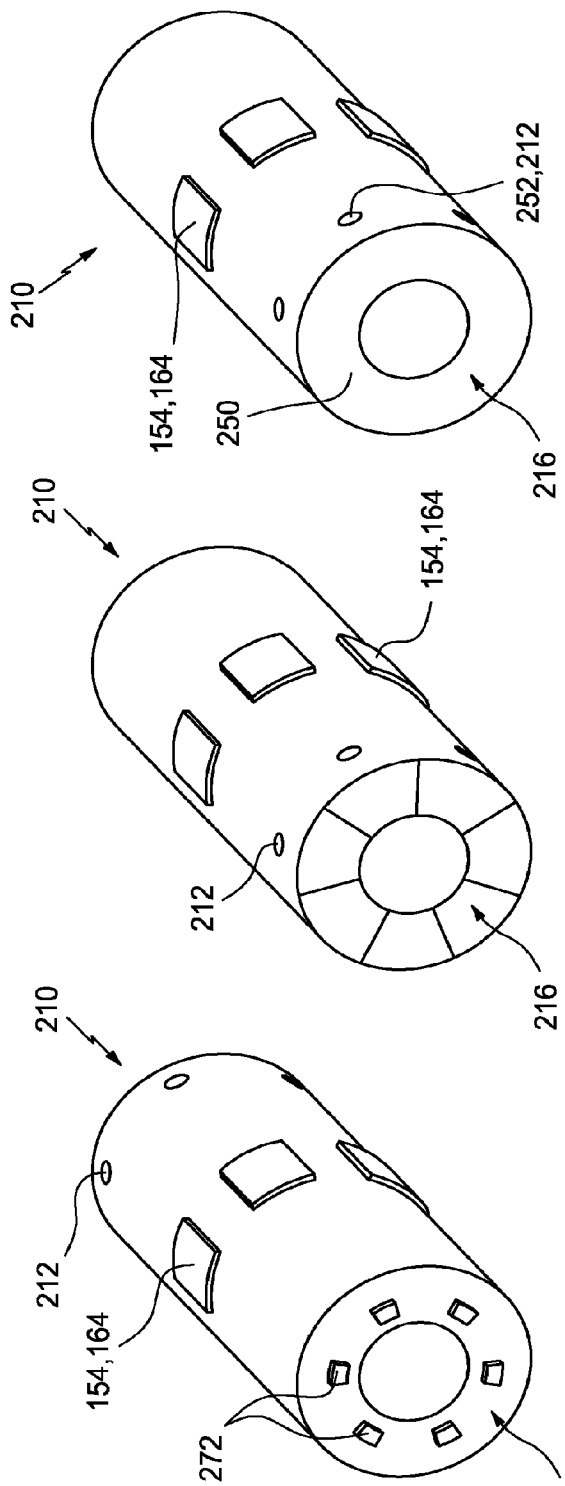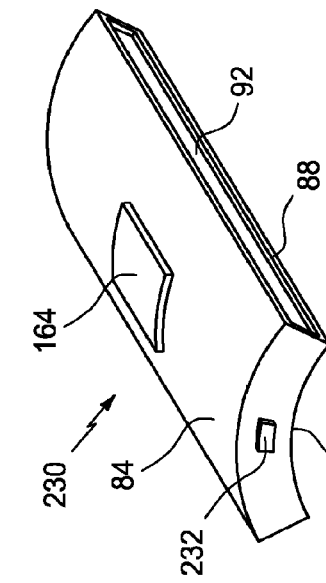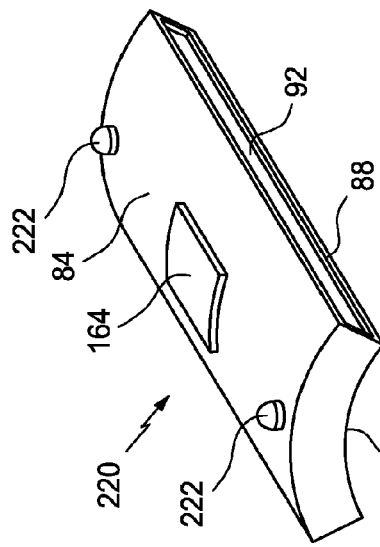

LINEAR MOTION BEARING WITH IMPROVED OUTER HOUSING SLEEVE

BACKGROUND OF THE INVENTION

Field of the Invention

This disclosure relates to a linear bearing.

Description of the Related Art

In a linear motion bearing, a generally cylindrical housing is designed to move relative to a shaft. The housing includes a ball retaining structure comprising a plurality of ball retaining segments. Each ball retaining segment includes a plurality of ball bearings moveable in a track. The segments are mounted within the housing so that movement of the housing with respect to the shaft is effectuated through engagement of the bearings with the shaft. As the housing moves, the ball bearings move in respective tracks. This disclosure describes an improvement on these prior art systems.

SUMMARY OF THE INVENTION

One embodiment of the invention is a linear motion bearing assembly. The assembly may comprise a ball retainer structure having at least a portion of a plurality of open axial ball tracks formed therein, the ball tracks including an open load bearing portion, an open return portion and turnarounds interconnecting the load bearing and return portions. The assembly may further comprise a plurality of bearing balls disposed in the ball tracks. The assembly may further comprise a plurality of load bearing plates axially positioned adjacent the ball retainer structure, the load bearing plates effective to receive a load from the balls disposed in the load bearing portion of the ball tracks. The assembly may further comprise a first outer housing sleeve effective to hold the ball retainer structure, the first outer housing sleeve having a shape of a hollow half-cylinder. The assembly may further comprise a second outer housing sleeve on top of the first outer housing sleeve and effective to hold the ball retainer structure, the second outer housing sleeve having a shape of a hollow half-cylinder.

Another embodiment of the invention is a linear motion bearing assembly. The assembly may comprise a ball retainer structure having at least a portion of a plurality of open axial ball tracks formed therein, the ball tracks including an open load bearing portion, an open return portion and turnarounds interconnecting the load bearing and return portions. The assembly may further comprise a plurality of bearing balls disposed in the ball tracks. The assembly may further comprise a plurality of load bearing plates axially positioned adjacent the ball retainer structure, the load bearing plates effective to receive load from the balls disposed in the load bearing portion of the ball tracks, each load bearing plate including at least a first mating member. The assembly may further comprise a monolithic outer housing sleeve effective to hold the ball retainer structure, the outer housing sleeve including a second mating member effective to mate with the first mating member.

Yet another embodiment of the invention is a linear motion bearing assembly. The assembly may comprise a ball retainer structure having at least a portion of a plurality of open axial ball tracks formed therein, the ball tracks including an open load bearing portion, an open return portion and turnarounds interconnecting the load bearing and return portions. The assembly may further comprise a plurality of bearing balls disposed in the ball tracks. The assembly may further comprise a monolithic load bearing plate axially positioned adjacent the ball retainer structure, the load bearing plate effective to receive load from the balls disposed in the load bearing portion of the ball tracks, the load bearing plate including a first mating member. The assembly may further comprise a monolithic outer housing sleeve effective to hold the ball retainer structure, the outer housing sleeve including a second mating member effective to mate with the first mating member.

BRIEF DESCRIPTION OF THE DRAWINGS

The drawings constitute a part of the specification and include exemplary embodiments of the present invention and illustrate various objects and features thereof.

FIG. 4 is a perspective view of the load bearing plate in accordance with the linear motion bearing assembly of FIG. 1.

FIG. 5 is a cross-sectioned view of the bearing plate to housing intermediary ring taken along line 5-5 of FIG. 1.

FIG. 6 is a perspective view of the assembled linear motion bearing assembly of FIG. 1.

FIG. 10A is a front perspective view of an outer housing sleeve.

FIG. 10B is a rear perspective view of an outer housing sleeve.

FIG. 11 is a perspective view of a load bearing plate.

FIG. 12 is a perspective view of a load bearing plate.

FIG. 13 is a rear perspective view of an outer housing sleeve.

DETAILED DESCRIPTION OF THE PREFERRED EMBODIMENT(S)

Figure 1:
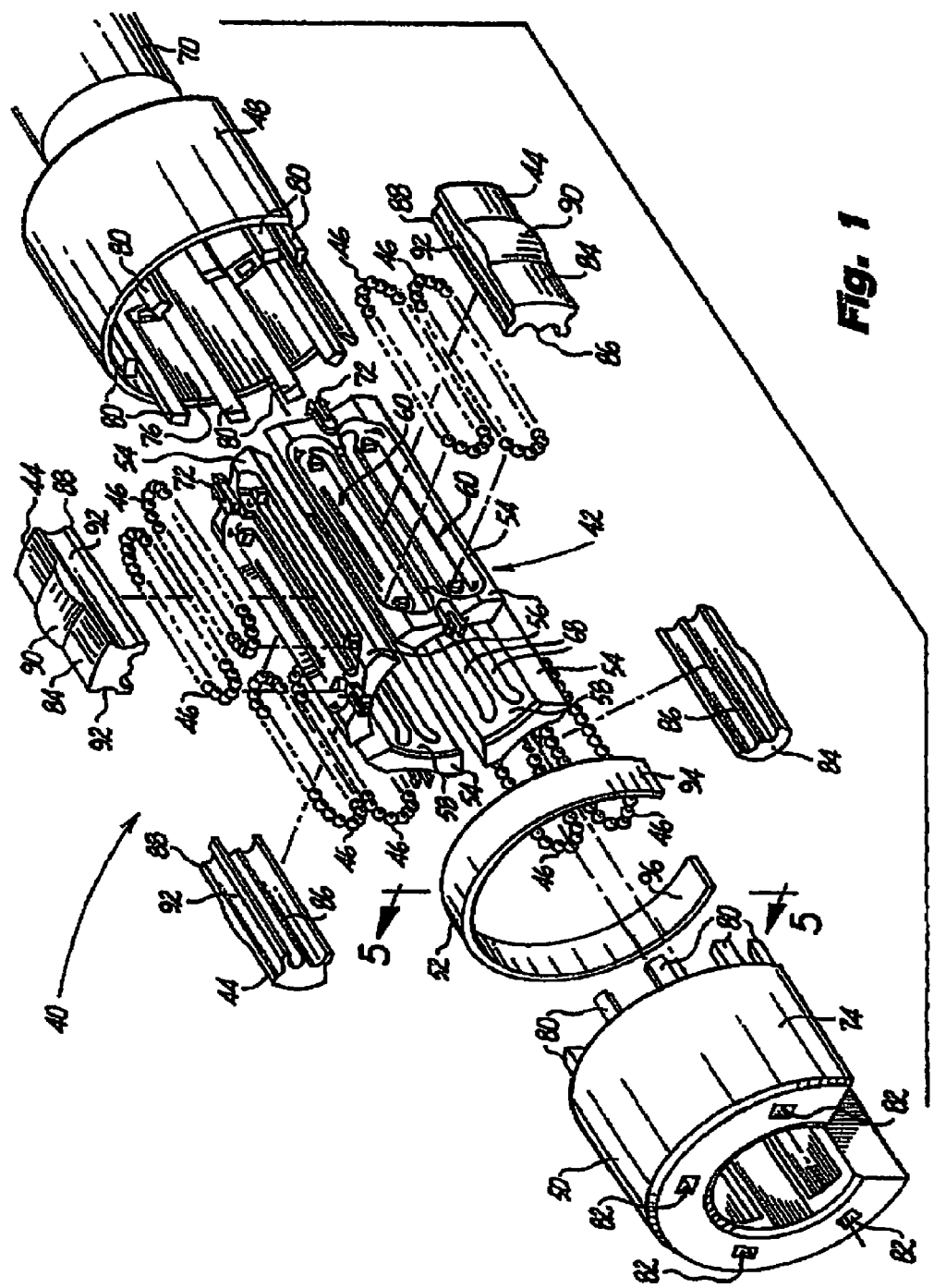
FIG. 1 is an exploded perspective view of a linear motion bearing assembly.
Figure 3B:
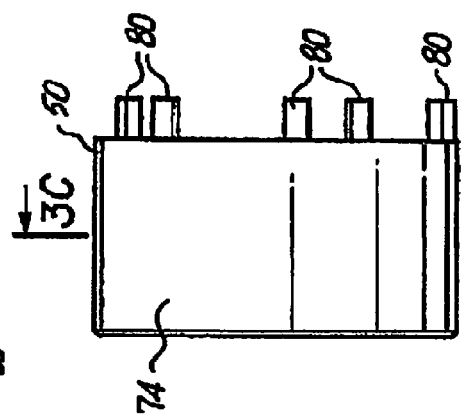
FIG. 3B is a side view of the sleeve portion of FIG. 3A.
Figure 3C:
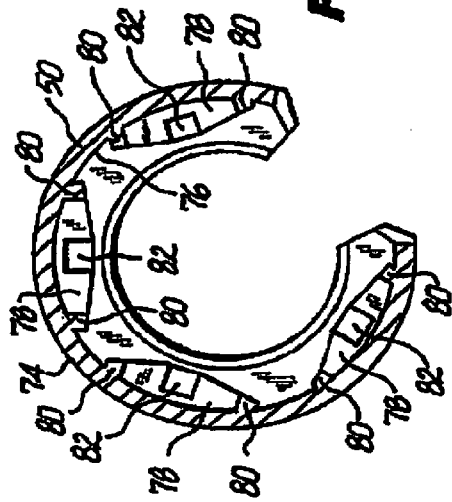
FIG. 3C is a cross-sectional view taken along line 3C-3C in FIG. 3B of the sleeve portion of FIG. 3A.

Various embodiments of the invention are described hereinafter with reference to the figures. Elements of like structures or function are represented with like reference numerals throughout the figures. The figures are only intended to facilitate the description of the invention or as a guide on the scope of the invention. In addition, an aspect described in conjunction with a particular embodiment of the invention is not necessarily limited to that embodiment and can be practiced in conjunction with any other embodiments of the invention.

Referring to FIGS. 1-6, there is shown a linear motion open-type bearing assembly 40. The bearing assembly includes ball retainer structure, shown generally at 42, load bearing plates 44, bearing balls 46, outer housing sleeves 48, 50 and bearing plate to housing intermediary load structure 52.

Figure 2:
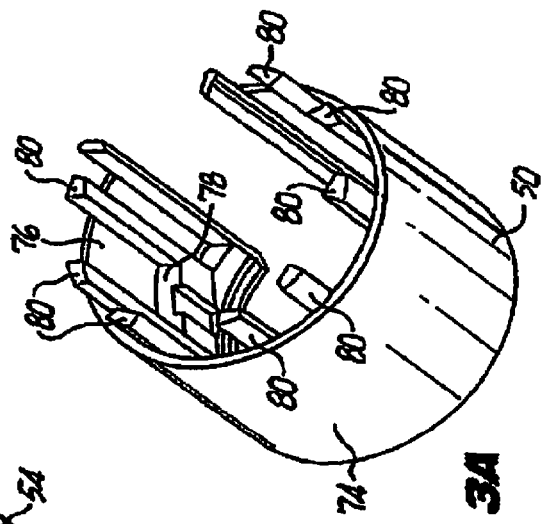
FIG. 2 is a perspective view of a ball retainer segment.
Figure 3A:
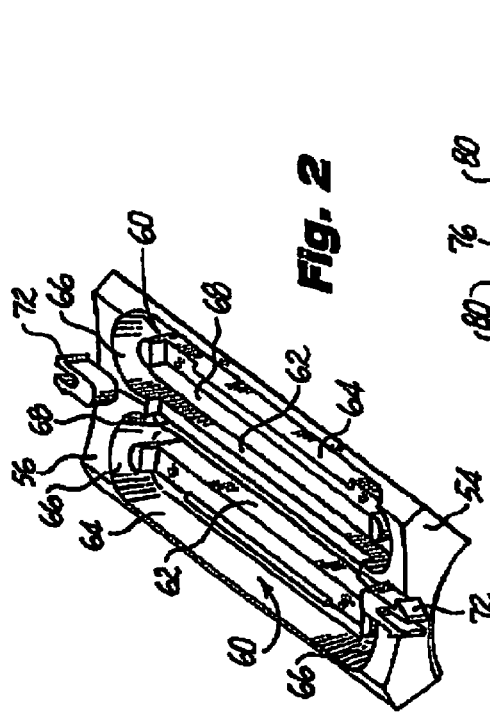
FIG. 3A is a perspective view of a sleeve portion of the outer housing of the linear motion bearing assembly of FIG. 1.

Focusing on FIG. 2, ball retainer structure 42, in one example, comprises four ball retainer segments 54, each operatively associated with adjacent ball retainer segments along longitudinal sides thereof to form a polygonally shaped ball retainer structure having a bore there through for receiving a shaft 70. Each ball retainer segment 54 includes an outer radial surface 56 and an inner radial surface 58. Axial ball tracks 60 are formed in the outer radial surface 56 of each ball retainer segment 54 and include load bearing portions 62, return portions 64 and turnarounds 66. The load bearing and return portions of the ball tracks in this embodiment are undercut to facilitate loading and retention of the bearing balls 46 therein. This also eliminates the need for a separate retainer structure to keep the bearing balls in the ball tracks. A longitudinal bore 68 in the inner radial surface 58 of the ball retainer segment 54 extends substantially the length of the load bearing portions 62 and accesses support shaft 70. Although support shaft 70 is illustrated as a substantially cylindrical shaft, support members of other configurations may also be used.

A plurality of bearing balls 46 are disposed in the ball tracks 60 with those bearing balls 46 in the load bearing tracks 62 extending at least partially into longitudinal bores 68 to contact support shaft 70. In this embodiment, a pair of axial ball tracks 60 are formed in each outer radial surface 56 of the ball retainer segment with the corresponding load bearing tracks being oriented in substantially parallel adjacent relation. This orientation facilitates enhanced load capacity and maximizes space utilization for a more compact and efficient bearing ball arrangement. A locking structure in the form of locking clips 72 are formed on opposing longitudinal ends of each ball retainer segment 54 to facilitate assembly with outer housing sleeves 48, 50, discussed in greater detail herein below.

Referring now to FIGS. 1 and 3A-C, the linear motion bearing assembly in accordance with one preferred embodiment includes a pair of outer housing sleeves 48, 50 which, when assembled serve to close and protect the exposed outer radial surfaces 56 of ball retainer structure 42.

The outer radial surface 74 of sleeves 48, 50 are preferably of a smooth cylindrical shape and are configured and dimensioned to fit within a mounting bore of a tool carriage (not shown). The inner radial surface 76 of sleeves 48, 50 include mounting surfaces 78 which are configured to receive at least a portion of load bearing plates 44 therein. These mounting surfaces 78 further include extension portions 80 which define a mounting space for bearing plate to housing intermediary load structure 52, described in greater detail below. Mounting surfaces 78 may be recessed from outer radial surface 74 by a distance approximating the cross-sectional radial thickness of bearing plate to housing intermediary load structure 52. In this manner, the outer housing sleeves 48, 50 and the bearing plate to housing intermediary load structure 52 combine to form a relatively smooth and uniform outer radial surface of the linear motion bearing assembly 40. See, FIG. 6.

In this embodiment, mounting surfaces 78 are configured to fit the shape of individual ball retainer segments 54. A plurality of locking bores 82 are formed in respective ends of sleeves 48, 50 in alignment with locking clips 72 of ball retainer segments 54. Thus, when the ball retainer segments 54 are assembled into the sleeves 48, 50, locking clip 72 extends into respective locking bores 82 and assists in holding linear motion bearing assembly 40 together.

Referring now to FIGS. 1 and 4, a plurality of individual load bearing plates 44 are incorporated into the linear motion bearing assembly 40 and serve to receive load from the bearing balls 46 in contact with shaft 70. In the embodiment of FIG. 4, load bearing plate 44 is elongated along the longitudinal axis of the bearing assembly and includes an outer radial surface 84, an inner radial surface 86, and a pair of side wall surfaces 88. The outer radial surface 84 is substantially accurate and may include a crown portion 90 disposed on the outer radial surface 84 in a medial position. Crown portion 90 is configured and dimensioned to permit the load bearing plates 44 to rock both circumferentially and longitudinally into and out of parallelism with the axes of the ball retainer structure 42.

The inner radial surface 86 of the load bearing plate is advantageously provided with a pair of axial grooves which serve as the upper surface of load bearing portions 62 of ball tracks 60. By providing a single load bearing plate 44 for each pair of load bearing portions 62 in each outer radial surface 56, the linear motion bearing assembly 40 is easier to fabricate and assemble. Further, the bearing assembly has a high load bearing capacity.

In this embodiment, a longitudinal groove 92 is formed in each side wall surface 88 of load bearing plates 44. These grooves 92 make up a side wall of the axial ball tracks 60 and guide bearing balls 46 as they move through the return portion thereof.

Referring now to FIGS. 1, 5 and 6, bearing plate to housing intermediary load structure 52 is illustrated in a C-ring configuration having an outer radial surface 94 conforming substantially in dimension to the outer radial surface 74 of sleeves 48, 50. In this embodiment, the inner radial surface 96 is substantially parallel to the outer radial surface and is configured and dimensioned, when assembled, to contact crown portion 90 of load bearing plates 44. In an example, the radius of curvature of the crown portion 90 in the transverse direction may be smaller than the radius of curvature of the inner radial surface of the bearing plate to housing intermediary load structure 52. This configuration allows the plates to rock circumferentially and longitudinally with respect to the inner surface of the bearing plate to housing intermediary load structure 52. In other examples, crown portion 90 is substantially flat as shown in FIG. 4.

Further, referring to FIGS. 1 and 6, the bearing plate to housing intermediary load structure 52 encompasses and engages extension portions 80 of sleeve 48, 50 to assist in enclosing and protecting ball retainer structure 42. Although shown in a narrow width, the bearing plate to housing intermediary load structure 52 may extend substantially the entire longitudinal length of the bearing assembly. The bearing plate to housing intermediary load structure is preferably formed of a hard abrasion resistant material such as, for example, stainless steel or ceramic. Alternatively, a softer material such as bronze or aluminum may also be used.

Figure 7:
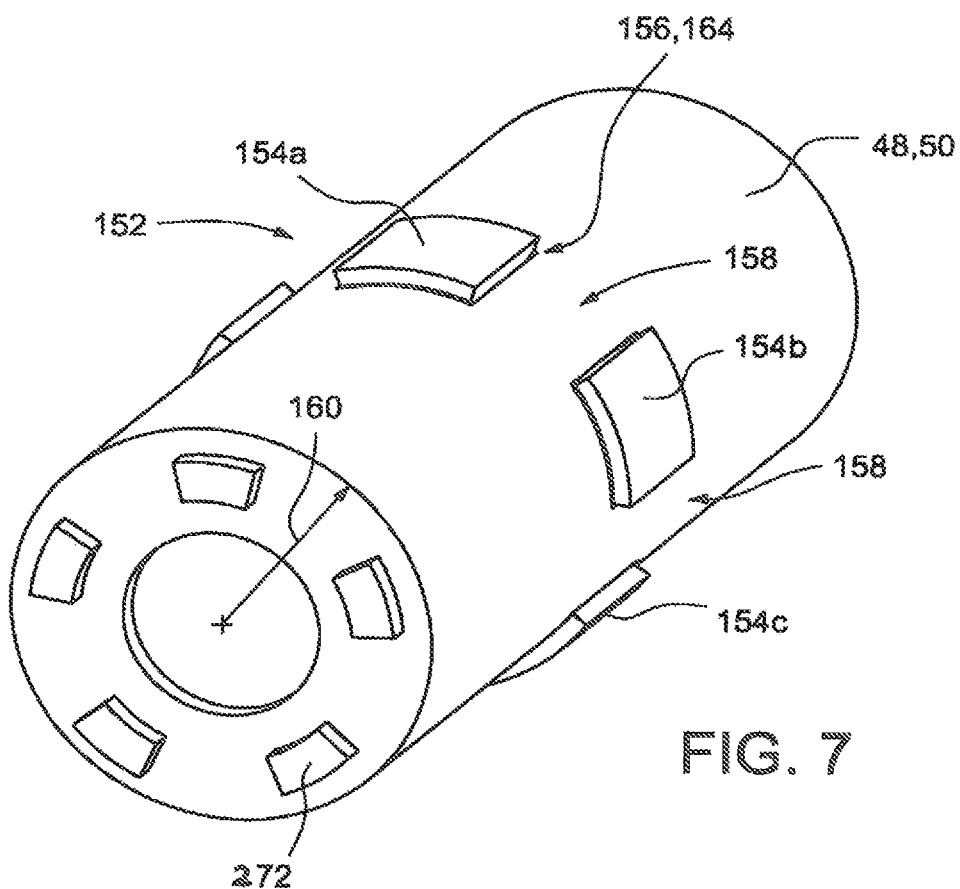
FIG. 7 is a perspective view of a linear motion bearing assembly.
Figure 8:
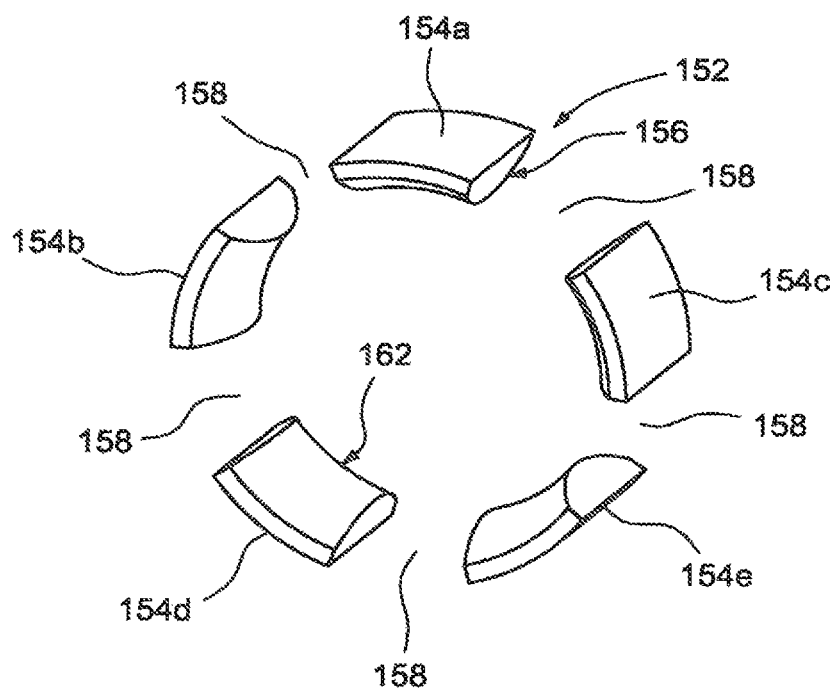
FIG. 8 is an exploded perspective view of a bearing plate to housing intermediary load structure.

FIGS. 7 and 8 are perspective view drawings of another bearing plate to housing intermediary load structure 152. Bearing plate to housing intermediary load structure 54 in FIGS. 1-6 was substantially one piece and monolithic. Bearing plate to housing intermediary load structure 152 is comprised of at least two discrete pieces 154 with spaces 158 in between pieces 154. Five pieces 154a, 154b, 154c, 154d, 154e are shown in FIG. 8 though any number of pieces could be used. Pieces 154 may be cylinders, spheres, flattened cylinders, pyramids, etc. An odd number of pieces may make it easier to tune bearing plate to housing intermediary load structure 152. Pieces 154 may be distributed around a circumference of sleeve 48, 50 so that each space 158 between each piece 154 is of the same size. Sleeve 48, 50 may comprise multiple pieces or a single piece.

Each piece 154 has an internal arc with a radius of curvature 162 (FIG. 8) that corresponds to or is slightly larger than a radius of curvature 160 of outer housing sleeve 48, 50. The inventor has discovered that the tolerance accuracy needed to manufacture monolithic bearing plate to housing intermediary load structure 52 (FIGS. 1-6) is quite high and therefore difficult and expensive to produce. In fact, a high percentage of manufactured pieces may need to be discarded because of the high necessary tolerances. If bearing plate to housing intermediary load structure 52 includes dimensions too far removed from defined tolerances, excess unbalanced pressure may be placed on outer housing sleeve 48, 50 and then on bearing balls 46.

In contrast, overall tolerance accuracy requirements are lower for bearing plate to housing intermediary load structure 152 having multiple pieces 154. Each piece 154 requires less tolerance accuracy which results in faster, less expensive manufacturing. Pieces 154 are less sensitive to twisting forces applied to outer housing sleeve 48, 50. Bearing plate to housing intermediary load structure 152 is less sensitive to out of "roundness" from each piece 154. Less material is used for bearing plate to housing intermediary load structure 152 and more manufacturing methods are available. Powder metal could be used to manufacture pieces 154.

A retention member 156 (best seen in FIG. 8) may be used to affix bearing plate to housing intermediary load structure 152 to outer housing sleeve 48, 50. Retention member 156 could be, for example, a flare from each piece 154, a male extension, a female extension, etc. A corresponding mating retention member 164 may be disposed in outer housing sleeve 48, 50. Mating retention member 164 could be, for example, a recess, a female extension, a male extension, etc. Each piece 154 may be pliant and biased toward the position shown in the figures. In this way, to assemble, each piece 154 may be pinched and inserted into recesses 164 of outer housing sleeve 48, 50 so that flares 156 are bent inwardly. The bias then causes piece 154 to resume the position shown to mate with recesses 158.

Figure 9:
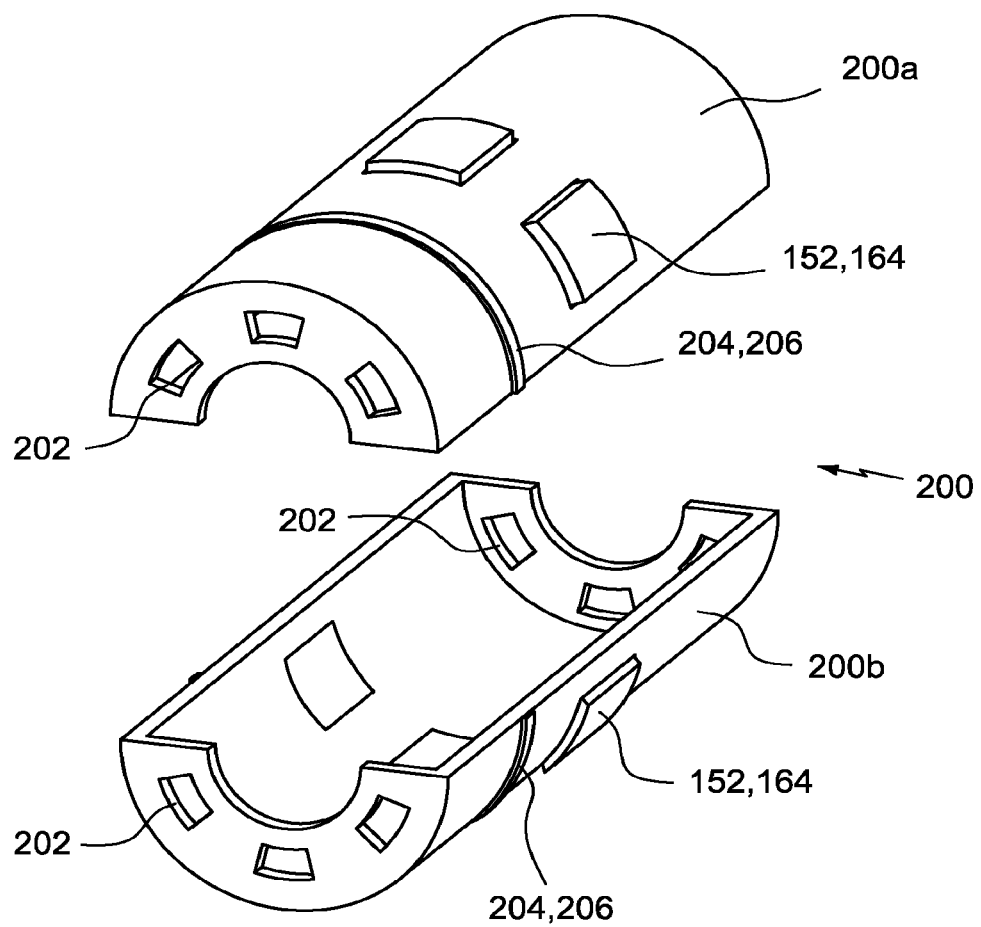
FIG. 9 is a front perspective view of an outer housing sleeve.

Referring to FIG. 9, there is shown another sleeve 200 which could be used in accordance with an embodiment of this disclosure. Unlike sleeve 48, 50 discussed above, sleeve 200 is split in half axially defining a top part 200a and a bottom part 200b. Top and bottom parts 200a, 200b may be identical and each form a hollow half cylinder. Pieces 154 of bearing plate to housing intermediary load structure 152 and recess 164 may be disposed in top and bottom parts 200a, 200b as discussed above. Walls defining openings 202 may be disposed at distal ends of sleeve 200 to mate with clips 72 of ball retainer segment 54 discussed above.

In order to assemble a linear bearing assembly using sleeve 200, top part 200a may be placed on top of bottom part 200b. Top and bottom parts 200a, 200b may be strapped together with a strap or clip 204. A recess 206 may be disposed circumferentially around sleeve 200 to receive strap or clip 204.

Sleeve 200 provides benefits not available in the prior art. For example, sleeve 200 may benefit from lower accuracy requirements during manufacture. Less accuracy requirements result in faster, less expensive manufacturing. Less tolerance for errors in size and shape is required for each part 200a, 200b. Further, as top and bottom parts 200a, 200b may be identical, only a single type of piece needs to be manufactured. This results is a simplified manufacturing process. Sleeve 200 can handle higher loads in the axial direction than the prior art structures resulting in higher axial strength.

FIGS. 10A and 10B shown another sleeve 210 that could be used in accordance with an embodiment of the disclosure. FIG. 10A shows a front 214 of sleeve 210 and FIG. 10B shows a rear 216 of sleeve 210. Sleeve 210 is a single monolithic structure so that no assembly of sleeve 210 is required. Sleeve 210 may further include pieces 154 of bearing plate to housing intermediary load structure 152 and recess 164. Mating recesses and/or protuberances 212, 272 may be disposed on sleeve 210 to mate with load bearing plates as discussed below.

FIG. 11 shows an example of load bearing plate 220 which could be used in accordance with an embodiment of the disclosure. Load bearing plate 220 may be elongated along the longitudinal axis of the bearing assembly and include an outer radial surface 84, an inner radial surface 86, and a pair of side wall surfaces 88 as with load bearing plate 44 discussed above. A longitudinal groove 92 may be formed in each side wall surface 88 of load bearing plate 220. A recess or protuberance 222 may be disposed on outer radial surface 84 of load bearing plate 220 and may be used to mate with recess or protuberance 212 on sleeve 210.

FIG. 12 shows an example of another load bearing plate 230 which could be used in accordance with an embodiment of the disclosure. Load bearing plate 230 may be elongated along the longitudinal axis of the bearing assembly and include an outer radial surface 84, an inner radial surface 86, and a pair of side wall surfaces 88 as with load bearing plate 44 discussed above. A longitudinal groove 92 may be formed in each side wall surface 88 of load bearing plate 220. A recess or protuberance 232 may be disposed on an axial end of load bearing plate 230 and may be used to mate with recess or protuberance 272 on sleeve 210.

To assemble a linear bearing including sleeve 210, again as sleeve 210 is a monolithic structure, no assembly of sleeve 210 is needed. Ball retainer structure 42 including ball retainer segments 54 (FIG. 1) and load bearing plates 220 and/or 230 may be inserted into rear 216 of sleeve 210. Each load bearing plate 220 may mate with sleeve 210 by pushing load bearing plate 220 radially outward so that recess/protuberance 222 of load bearing plate 220 mates with recess/protuberance 212 of sleeve 210. Similarly, each load bearing plate 230 may mate with sleeve 210 by pushing load bearing plate 220 axially so that recess/protuberance 232 of load bearing plate 230 mates with recess/protuberance 272 of sleeve 210. A plurality of load bearing plates 220, 230 perhaps of differing configurations may be used in a single sleeve 210. Alternatively, as shown in FIG. 13, a single monolithic load bearing plate 250 may be placed inside sleeve 210. Load bearing plate 250 may similarly include a recess or protuberance 252 that can mate with recess/protuberance 212.

A linear bearing including sleeve 210 provides significantly greater structural integrity than that available in the prior art. A monolithic structure for sleeve 210 means that the sleeve cannot be disassembled without literally breaking the structure apart. Assembly of a linear bearing including sleeve 210 is simpler than prior art structures because no assembly of sleeve 210 is needed.

While the invention has been described with reference to a number of exemplary embodiments, it will be understood by those skilled in the art that various changes can be made and equivalents can be substituted for elements thereof without departing from the scope of the invention. In addition, many modifications can be made to adapt a particular situation or material to the teachings of the invention without departing from essential scope thereof. Therefore, it is intended that the invention not be limited to any particular exemplary embodiment disclosed herein.

What is claimed is:

1. A linear motion bearing assembly comprising:
a ball retainer structure having at least a portion of a plurality of open axial ball tracks formed therein, the ball tracks including an open load bearing portion, an open return portion and turnarounds interconnecting the load bearing and return portions;
a plurality of bearing balls disposed in the ball tracks;
a plurality of load bearing plates axially positioned adjacent the ball retainer structure, the load bearing plates effective to receive a load from the balls disposed in the load bearing portion of the ball tracks;
a first outer housing sleeve effective to hold the ball retainer structure, the first outer housing sleeve having a shape of a hollow half-cylinder;
a second outer housing sleeve adjacent the first outer housing sleeve and effective to hold the ball retainer structure, the second outer housing sleeve having a shape of a hollow half-cylinder; and
a bearing plate to housing intermediary load structure, the bearing plate to housing intermediary load structure comprising a plurality of pieces and defining at least two spaces in between the pieces, the bearing plate to housing intermediary load structure extending circumferentially around the first and second outer housing sleeve.

2. The linear motion bearing assembly as recited in claim 1, further comprising a strap or a clip extending around the first and second outer housing sleeve.

3. The linear motion bearing assembly as recited in claim 2, further comprising walls defining a recess disposed circumferentially around the first and second outer housing sleeve, the recess effective to receive the strap or clip.

4. The linear motion bearing assembly as recited in claim 1, wherein the first and second outer housing sleeve have the same structure.

5. The linear motion bearing assembly as recited in claim 4, wherein the first and second outer housing sleeves have walls defining openings; and
the ball retainer structure includes clips effective to mate with the openings.

6. The linear motion bearing assembly as recited in claim 1, wherein the first and second outer housing sleeve are substantially identical.

7. The linear motion bearing assembly as recited in claim 1, wherein the first and second outer housing sleeves have walls defining openings; and
the ball retainer structure includes clips effective to mate with the openings.

8. A linear motion bearing assembly, comprising:
a ball retainer structure having at least a portion of a plurality of open axial ball tracks formed therein, the ball tracks including an open load bearing portion, an open return portion and turnarounds interconnecting the load bearing and return portions;
a plurality of bearing balls disposed in the ball tracks;
a plurality of load bearing plates axially positioned adjacent the ball retainer structure, the load bearing plates effective to receive a load from the balls disposed in the load bearing portion of the ball tracks;
a first outer housing sleeve effective to hold the ball retainer structure, the first outer housing sleeve having a shape of a hollow half-cylinder;
a second outer housing sleeve adjacent the first outer housing sleeve and effective to hold the ball retainer structure, the second outer housing sleeve having a shape of a hollow half-cylinder;
a strap or a clip extending around the first and second outer housing sleeve;
walls defining a recess disposed circumferentially around the first and second outer housing sleeve, the recess effective to receive the strap or clip; and
a bearing plate to housing intermediary load structure, the bearing plate to housing intermediary load structure comprising a plurality of pieces and defining at least two spaces in between the pieces, the bearing plate to housing intermediary load structure extending circumferentially around the first and second outer housing sleeve; wherein
the first and second outer housing sleeve have the same structure;
the first and second outer housing sleeves have walls defining openings; and
the ball retainer structure has clips effective to mate with the openings.

* * * * *